United States Patent [19]

Cihon et al.

[11] 3,847,568
[45] Nov. 12, 1974

[54] VITRIFIED ABRASIVE ELEMENT

[75] Inventors: John A. Cihon; Donald W. Ehmann, both of Owosso, Mich.

[73] Assignee: MWA Company, Owosso, Mich.

[22] Filed: Sept. 18, 1972

[21] Appl. No.: 290,128

[52] U.S. Cl.................... 51/295, 51/296, 51/308
[51] Int. Cl......................... B24d 3/14, B24d 3/18
[58] Field of Search..................... 51/295, 296, 308

[56] References Cited
UNITED STATES PATENTS

| | | | |
|---|---|---|---|
| 3,576,610 | 4/1971 | Mathewson | 51/295 |
| 3,702,758 | 11/1972 | Fukui et al. | 51/308 |
| 3,269,815 | 8/1966 | Koopman | 51/308 |
| 3,539,315 | 11/1970 | Bidwell | 51/308 |
| 2,782,110 | 2/1957 | Cantrell | 51/308 |

*Primary Examiner*—Donald J. Arnold
*Attorney, Agent, or Firm*—Whittemore, Hulbert & Belknap

[57] ABSTRACT

A vitrified abrasive element such as a grinding wheel made from a mixture of (1) abrasive grit composed primarily of aluminum oxide ($Al_2O_3$), (2) a ceramic bonding material which may include feldspar, frit and clay and (3) a pore-forming material comprising glass cullet such, for example, as crushed or broken soda-lime glass having a strong affinity for the abrasive grit when melted by heating. The mixture is heated to vitrify the bonding material and melt the glass cullet, causing the glass to be attracted to and coat the abrasive grit and form a bond with the abrasive grit and with the bonding material. Voids are left in the spaces previously occupied by the crushed glass, producing a porous structure.

10 Claims, 4 Drawing Figures

VITRIFIED ABRASIVE ELEMENT

BACKGROUND AND SUMMARY OF THE INVENTION

Conventional vitrified grinding wheels are composed of abrasive grit which may consist primarily of aluminum oxide, ($Al_2O_3$) plus a ceramic bond composed of feldspar, frit and clay. Such wheels should have a porous structure because pores provide microscopic interruptions between the grains of abrasive for cooler cutting action and less damage to the work. Examples of conventional pore-forming materials are coke, sawdust, walnut shells, naphthelene crystals and paradichlorobenzene (moth balls). These are organic materials which burn out when the wheel is molded to leave voids or pores. However, such materials have certain disadvantages. They are relatively light and hence tend to segregate or become non-uniformly distributed during handling and mixing. A further disadvantage is that these pore-forming materials do not always burn out completely and hence sometimes leave a residue.

In place of these conventional pore-forming materials, our invention contemplates the substitution of glass cullet, such as crushed or broken soda-lime glass. The glass cullet is mixed with the abrasive grit and the unvitrified bonding material. When the mixture is fired, the bonding material vitrifies and the glass cullet melts. The melted glass, being $R_2O_3$ starved (R representing a positive ion) has a strong attraction for the abrasive particles of $Al_2O_3$ and is drawn to them and covers them with a thin film of the glass, leaving voids where the glass lumps used to be. These voids provide a porous wheel structure. The glass bonds not only to the abrasive grit but also to the bonding material to provide an extremely high strength wheel having longer life characteristics than conventional vitrified grinding wheels.

Figure 1:
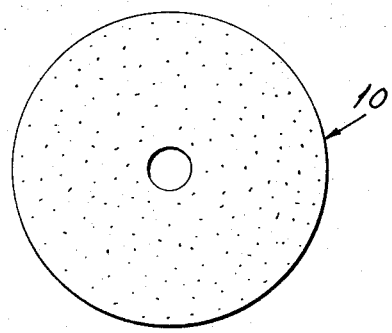
FIG. 1 is a perspective view of a grinding wheel made in accordance with our invention.
Figure 2:
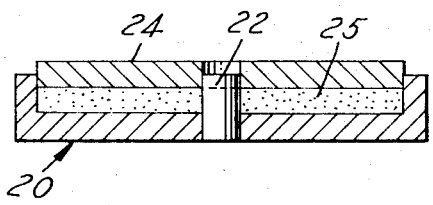
FIG. 2 is a semi-diagrammatic view of a mold containing a mixture of abrasive grit, bonding material and glass cullet, before the mixture is fired to form the grinding wheel of FIG. 1.

Referring now more particularly to the drawing, an abrasive element is shown in FIG. 1 as being in the form of a grinding wheel 10. Obviously it might take other forms such, for example, as a honing stick or stone.

The grinding wheel is composed essentially of a mixture of three constituents, namely, abrasive grit 12, ceramic bonding material 14 and broken or crushed glass cullet 16. These constituents are heated to vitrify the bonding material and melt the glass. In the completed wheel, the glass bonds to and coats the abrasive grit with a thin coating 16', leaving voids 26 where the lumps of glass used to be. The vitrified bonding material forms webs 14' which bond to the glass coating to form an exceedingly strong composite structure.

The abrasive grit 12 in this instance is composed primarily of grains of aluminum oxide ($Al_2O_3$). The aluminum oxide should make up 70 percent or more by weight of the total abrasive grit. Normally the abrasive grit is at least 85 percent and preferably over 95 percent aluminum oxide. The remainder of the abrasive grit may be made up of varying amounts of other oxides such as titanium oxide ($TiO_2$), silica ($SiO_2$), iron oxide ($Fe_2O_3$), sodium oxide ($Na_2O$), zirconium oxide ($ZrO_2$), magnesium oxide (MgO) and calcium oxide (CaO).

The abrasive grit size may vary widely and good results have been obtained with particle sizes of from 46 grit to 220 grit.

Examples of suitable abrasive grit are:

"Blue Firing"

| Material (hard) | Weight Percent |
|---|---|
| $Al_2O_3$ | 97.03 |
| $TiO_2$ | 2.10 |
| $SiO_2$ | 0.50 |
| $Fe_2O_3$ | 0.20 |
| $Na_2O$ | 0.02 |
| $ZrO_2$ | 0.13 |
| MgO + CaO | 0.02 |

"White" — (soft)

| Material | Weight Percent |
|---|---|
| $Al_2O_3$ | 99.53 |
| $SiO_2$ | 0.04 |
| $Fe_2O_3$ | 0.10 |
| $Na_2O$ | 0.33 |

"Off-White" — (Intermediate)

| Material | Weight Percent |
|---|---|
| $Al_2O_3$ | 98.50 |
| $SiO_2$ | 0.07 |
| $Fe_2O_3$ | 0.20 |
| $Na_2O$ | 0.33 |
| $ZrO_2$ | 0.40 |
| MgO + CaO | 0.50 |

The ceramic bonding material usually contains a mixture of feldspar [silica ($SiO_2$), sodium oxide ($Na_2O$) and potassium oxide ($K_2O$)], frit [silica ($SiO_2$), calcium oxide (CaO) sodium oxide ($Na_2O$) and potassium oxide ($K_2O$)], and clay [silica ($SiO_2$) and aluminum oxide ($Al_2O_3$)]. The total mix is preferably composed of a major amount of silica ($SiO_2$) and a minor amount of aluminum oxide ($Al_2O_3$) with small or trace amounts of other oxides.

Examples of suitable ceramic bonding materials containing feldspar, frit and clay are:

| Material — Bond C | Weight Percent |
|---|---|
| $SiO_2$ | 59.23 |
| $Al_2O_3$ | 17.84 |
| $Fe_2O_3$ | 0.48 |
| CaO | 0.32 |
| $Na_2O$ | 7.46 |
| $K_2O$ | 3.16 |
| $B_2O_3$ | 10.83 |
| MgO | 0.12 |
| $TiO_2$ | 0.63 |

| Material — Bond J | Weight Percent |
|---|---|
| $SiO_2$ | 65.8 |
| $Al_2O_3$ | 17.7 |
| $Fe_2O_3$ | 0.4 |
| $TiO_2$ | 0.7 |
| $B_2O_3$ | 3.5 |
| CaO | 4.8 |
| MgO | 2.1 |
| $Na_2O$ | 2.4 |
| $K_2O$ | 2.6 |

The particle size of the bonding material may vary widely and is usually no larger than 320 grit.

The glass cullet is crushed or broken glass and again the particle size may vary widely but preferably is in the range of 12 grit to 180 grit.

The glass cullet is composed of at least 50 percent silica ($SiO_2$). Particularly good results have been obtained with a soda-lime glass containing a major amount of silica and minor amounts of sodium oxide ($Na_2O$) and calcium oxide (CaO). A typical range of ingredients would be 60–80% $SiO_2$, 10–20% $Na_2O$ and/or $K_2O$, 5–15% CaO, and trace amounts of $Al_2O_3$, $fe_2O_3$, $SO_3$, MgO and $B_2O_3$.

A preferred soda-lime glass identified as Example G is:

| Material — G | Weight Percent |
|---|---|
| $SiO_2$ | 71.35 |
| $Na_2O$ | 13.90 |
| CaO | 11.71 |
| MgO | 2.63 |
| $K_2O$, $Al_2O_3$, $Fe_2O_3$, $SO_3$, and $B_2O_3$ | trace amounts |

Grinding wheels of various different compositions within the scope of this invention have been made and tested and the following chart indicates the composition of such wheels. The wheels fall generally into three groups or series indicated as Series A having 80 grit abrasive, Series B having 60 grit abrasive and Series C having 46 grit abrasive. The glass used was the Example G above. In each series the different wheel compositions are indicated by 1A, 2A, 1B, 2B, etc.

Wheel Composition (Parts by weight)
Using one-half "Blue Firing" abrasive grit and one-half "White" abrasive grit:

Series A — 80 Grit Abrasive

| Material | 1A | 2A | 3A | 4A | 5A | 6A |
|---|---|---|---|---|---|---|
| Abrasive Grit | 92 | 90 | 88 | 94 | 96 | 98 |
| Bond C | 8 | 10 | 12 | 6 | 4 | 2 |
| Glass 20/40*(G) | 8 | 10 | 12 | 6 | 4 | 2 |

Series B — 60 Grit Abrasive

| Material | 1B | 2B | 3B | 4B | 5B | 6B |
|---|---|---|---|---|---|---|
| Abrasive Grit | 92 | 90 | 88 | 94 | 96 | 98 |
| Bond C | 8 | 10 | 12 | 6 | 4 | 2 |
| Glass 20/40*(G) | 8 | 10 | 12 | 6 | 4 | 2 |

Series C — 46 Grit Abrasive

| Material | 1C | 2C | 3C | 4C | 5C | 6C |
|---|---|---|---|---|---|---|
| Abrasive Grit | 92 | 90 | 88 | 94 | 96 | 98 |
| Bond C | 8 | 10 | 12 | 6 | 4 | 2 |
| Glass 20/40*(G) | 8 | 10 | 12 | 6 | 4 | 2 |

*20/40 size means particles ranging from about 420 to about 1060 microns diameter All of the wheels listed above were molded to given densities (structures) by compressing the mixes prior to firing so that wheels 1A, 1B and 1C had the same densities, wheels 2A, 2B and 2C had the same densities, wheels 3A, 3B and 3C had the same densities, etc. Thus wheels 1A, 1B and 1C were compressed under pressure of about three-fourths ton/sq.in., wheels 2A, 2B and 2C were compressed under pressure of about five-eighths ton/sq.in., wheels 3A, 3B and 3C were compressed under pressure of about 1 ton/sq.in., wheels 4A, 4B and 4C were compressed under pressure of about one-half ton/sq.in., wheels 5A, 5B and 5C were compressed under pressure of about three-eighths ton/sq.in., and wheels 6A, 6B and 6C were compressed under pressure of about one-fourth ton/sq.in.

Also made and tested were grinding wheels having similar compositions and densities to certain of those listed in the above charts, but with variations as indicated:

Wheel Composition (Parts by Weight)

| | Variation 1 | |
|---|---|---|
| Material | Weight Parts | Variation |
| Abrasive Grit (100 grit) | 90 | Same as wheel 2A, but different abrasive grit size |
| Bond C | 10 | |
| Glass 20/40 (G) | 10 | |

| | Variation 2 | |
|---|---|---|
| Material | Weight Parts | Variation |
| Abrasive Grit | 98 | Same as wheel 6A, but different bond-glass ratio |
| Bond C | 2 | |
| Glass 20/40 (G) | 6 | |

| | Variation 3 | |
|---|---|---|
| Material | Weight Parts | Variation |
| Abrasive Grit | 75 | Same as wheel 3A, but increased bond and glass content |
| Bond C | 25 | |
| Glass 20/40 (G) | 25 | |

| | Variation 4 | |
|---|---|---|
| Material | Weight Parts | Variation |
| Abrasive Grit | 96 | Same as wheel 5A, but different glass particle size (finer) |
| Bond C | 4 | |
| Glass X-180* (G) | 4 | |

| | Variation 5 | |
|---|---|---|
| Material | Weight Parts | Variation |
| Abrasive Grit (white) | 96 | Same as wheel 5A, but different abrasive grain (soft) |
| Bond C | 4 | |
| Glass 20/40 (G) | 4 | |

| | Variation 6 | |
|---|---|---|
| Material | Weight Parts | Variation |
| Abrasive Grit (off white) | 96 | Same as wheel 5A, but different abrasive grain (intermediate hardness) |
| Bond C | 4 | |
| Glass 20/40 (G) | 4 | |

| | Variation 7 | |
|---|---|---|
| Material | Weight Parts | Variation |
| Abrasive Grit | 90 | Same as wheel 2A, but using a softer bond |
| Bond J | 10 | |
| Glass 20/40 (G) | 10 | |

| | Variation 8 | |
|---|---|---|
| Material | Weight Parts | Variation |
| Abrasive Grit | 88 | Same as wheel 3A, but softer bond and different glass bond ratio |
| Bond J | 12 | |

Wheel Composition (Parts by Weight)-Continued

Variation 1

| Material | Weight Parts | Variation |
|---|---|---|
| Glass 20/40 (G) | 2 | |

Variation 9

| Material | Weight Parts | Variation |
|---|---|---|
| Abrasive Grit | 94 | Same as wheel 4A, but softer bond and different glass bond ratio |
| Bond J | 6 | |
| Glass 20/40 (G) | ½ | |

Variation 10

| Material | Weight Parts | Variation |
|---|---|---|
| Abrasive Grit | 96 | Same as wheel 5A, but different bond and larger glass particle size |
| Bond J | 4 | |
| Glass 12/16** (G) | 4 | |

\* X-180 glass particle size is approximately 65–70 microns
\*\* 12/16 particle size is 1200–1750 microns.

Figure 3:
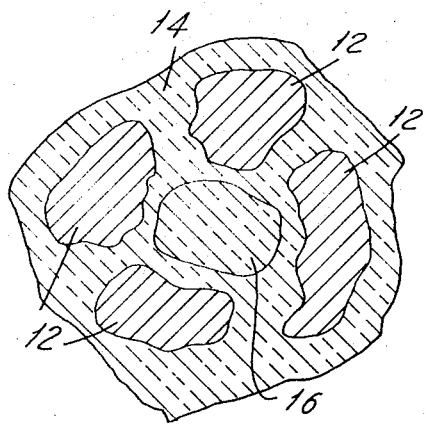
FIG. 3 is an enlarged fragmentary diagrammatic view of the mixture in the mold of FIG. 2.
Figure 4:
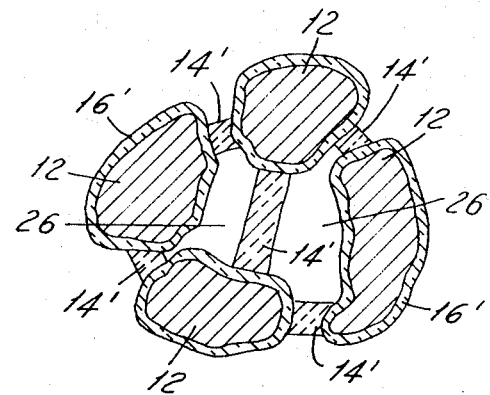
FIG. 4 is a view similar to FIG. 2 after the mixture has been fired and the grinding wheel completely formed, diagrammatically showing the structure of the wheel.

All of the abrasive wheels of this invention made and tested were made by mixing the grains of abrasive 12, grains of unvitrified bonding material 14 and broken or crushed glass cullet 16 together in the proper proportions and placing the mix in a mold assembly 20 having a central steel arbor 22 and a removable top plate 24. FIG. 3 indicates the mixture 25 in the mold. The mold assembly containing the mixture was placed in a press and compressed to the indicated pressure set forth above depending on which wheels were being made. Wheels 1A, 1B and 1C were compressed under pressure of about three-fourths ton per square inch, wheels 2A, 2B and 2C were compressed under pressure of about five-eighths ton per square inch, etc., as indicated herein above. The compressed mixture was next removed from the mold, taken to a kiln and fired at a temperature of between about 2,300°F and 2,500°F which is a temperature sufficient to vitrify the bonding material. The glass cullet softened and melted at a considerably lower temperature between about 1,250°F and 1,400°F. The wheels were then allowed to cool and this completed the manufacturing process. FIG. 4 shows diagrammatically the structure of the completed wheel.

When melted, the glass cullet developed a strong attraction for the abrasive particles of $Al_2O_3$ and were drawn to them and covered them with a thin film of glass 16' leaving voids where the lumps of glass used to be. These voids provided a porous wheel structure as clearly seen in FIG. 4 where the voids or pores are designated 26. The glass also bonded to the vitrified bonding material which formed webs 14' linking the glass covered abrasive particles together.

The chemical explanation which makes possible the glass coating of the abrasive particles and the formation of pores in the wheel structure is believed to be as follows: A balanced ceramic system is one in which the free energy within is at a minimum and one which contains proper amounts of constituents of the following three types (the letter R referring to any positive ion):

| | |
|---|---|
| $RO_2$ (network former) | $SiO_2$, for example |
| RO (fluxes) | CaO, $Na_2O$, $K_2O$, for example |
| $R_2O_3$ (network modifier) | $Al_2O_3$, for example |

Typically these materials, in a balanced ceramic system are in a proportion according to the ratio:
$RO_2$: RO: $R_2O_3$:: 1.00: 0.2: 0.4.

In a conventional soda-lime glass, no oxides of the $R_2O_3$ group are present in significant amounts. Consequently, at high temperatures, the soda-lime glass has an energy imbalance. This imbalance can be satisfied only by the addition of oxides of the $R_2O_3$ group to the system.

In a vitrified aluminum oxide grinding wheel of conventional construction and having no glass cullet, the normal bonding materials used have had only a slight deficiency of the $R_2O_3$ group. Thus the mixture of abrasive grit and bonding material was raised to vitrifying temperatures, only a slight "wetting" (coating of the abrasive grain by the bond) has occurred. However, when particles of glass are added to the system in accordance with our invention, at high temperatures a significant imbalance exists. The glass and the bond, at high temperatures, act separately and independently. The bond acts as before, slightly wetting the grain. The glass however, to satisfy its energy imbalance, must move into very close proximity to the $Al_2O_3$ grain. Because the glass acts independently of the bond, the volume formerly occupied by the glass becomes a void.

The use of glass cullet not only forms the desired porous wheel structure but also improves the bond strength of the wheel. The glass produces a strong bond at the interface with the bonding material and produces a still stronger bond at the interface with the grains of abrasive. This greater strength of the bond holds the abrasive grains to the wheel longer than possible in conventional wheels, thus improving wheel life.

Grinding wheels constructed in accordance with this invention, have been found to be superior to standard grinding wheels presently on the market both from the standpoint of stock removal and from the standpoint of tool life. One such standard grinding wheel, identified in the test charts to follow as "Standard A" is a wheel containing an abrasive grit consisting of one-half "Blue Firing" and one-half "White" abrasive, the compositions for which have been set forth herein above. The abrasive particle size of the standard A grinding wheel is 46 grit and the bond is the bond J also identified by its constituent parts hereinabove. The standard A grinding wheel is composed of 90 parts by weight of abrasive grit and 9 parts by weight of the bond.

Comparative tests were also made against a standard grinding wheel presently on the market and identified hereinafter as "Standard B." Standard B is a grinding wheel having abrasive consisting of about 95 percent aluminum oxide $Al_2O_3$ and 5 percent vanadium. The particle size of the grains of abrasive in the standard B wheel is 46 grit, and the bond is the bond identified hereinabove as bond J. In the standard B wheel, the composition is approximately 93 percent abrasive grain and approximately 7 percent bond.

The following charts compare wheels constructed in accordance with this invention and identified as wheels 4C and 5C with the conventional wheels standard A and standard B indicating metal removed and wheel loss as well as the ratio of metal removed to wheel loss. In the first test listed, the metal ground was Tungsten base tool steel (T-15) having a Rockwell hardness ($R_c$) of 65; in the second test the metal was an AISI steel (AISI 52100), and in the third test the metal was a molybdenum based steel (M 2) having a Rockwell hardness of 55.

| T – 15 TOOL STEEL ($R_c$ = 65) | | | |
|---|---|---|---|
| DEPTH OF CUT (INCHES) | .002 | .005 | .010 |
| WHEEL 5C | | | |
| Steel Removed (lbs.) | 28 | 21 | 13 |
| Wheel Loss (lbs.) | 3 | 3 | 4 |
| Ratio (steel)/(wheel) | 9.33 | 7.00 | 3.25 |
| STANDARD B | | | |
| Steel Removed (lbs.) | 23 | 19 | 15 |
| Wheel Loss (lbs.) | 3 | 3 | 5 |
| Ratio (steel)/(wheel) | 7.67 | 6.33 | 3.00 |
| STANDARD A | | | |
| Steel Removed (lbs.) | Burned | Burned | Burned |
| Wheel Loss (lbs.) | Metal | Metal | Metal |
| Ratio (steel)/(wheel) | No Test | No Test | No Test |

| AISI 52100 STEEL | |
|---|---|
| DEPTH OF CUT (INCHES) | .010 |
| WHEEL 4C | |
| Steel Removed (lbs.) | 49 |
| Wheel Loss (lbs.) | 0.5 |
| Ratio (steel)/(wheel) | 98.0 |
| STANDARD B | |
| Steel Removed (lbs.) | 57.0 |
| Wheel Loss (lbs.) | 2.0 |
| Ratio (steel)/(wheel) | 28.5 |
| STANDARD A | |
| Steel Removed (lbs.) | 40.5 |
| Wheel Loss (lbs.) | 3.0 |
| Ratio (steel)/(wheel) | 13.5 |

| M 2 STEEL ($R_c$ = 55) | | | |
|---|---|---|---|
| DEPTH OF CUT (INCHES) | .002 | .005 | .010 |
| WHEEL 5C | | | |
| Steel Removed (lbs.) | 65 | 60 | 25 |
| Wheel Loss (lbs.) | 1 | 2 | 2 |
| Ratio (steel)/(wheel) | 65.0 | 30.0 | 12.5 |
| STANDARD B | | | |
| Steel Removed (lbs.) | 60 | 30 | 24 |
| Wheel Loss (lbs.) | 2 | 4 | 6 |
| Ratio (steel)/(wheel) | 30 | 7.5 | 4.0 |
| STANDARD A | | | |
| Steel Removed (lbs.) | | | |
| Wheel Loss (lbs.) | Burned Metal at all Cuts | | |
| Ratio (steel)/(wheel) | | | |

As shown by these comparative tests, the ratio of steel removal to wheel loss for the grinding wheel of this invention was in each instance superior to the ratio for the standard wheels.

What we claim as our invention is:

1. A vitrified abrasive element comprising abrasive grit composed primarily of grains of aluminum oxide ($Al_2O_3$), a porous ceramic bonding material, and a glass which coats and is bonded to said abrasive grit and is bonded to said ceramic bonding material, said glass having no more than trace amounts of compounds of the $R_2O_3$ type in which R represents any positive ion.

2. The abrasive element defined in claim 1, wherein said glass includes a major amount of silica ($SiO_2$) and minor amounts of sodium oxide ($Na_2O$) and calcium oxide (CaO).

3. The abrasive element defined in claim 1 wherein said bonding material is composed of a major amount of silica ($SiO_2$) and a minor amount of aluminum oxide ($Al_2O_3$).

4. A vitrified abrasive element comprising abrasive grit composed primarily of grains of aluminum oxide ($AL_2O_3$), soda-lime glass having no more than trace amounts of compounds of the $R_2O_3$ type in which R represents any positive ion, and a porous ceramic bonding material including feldspar, frit and clay, said soda-lime glass coating said abrasive grit and being bonded to said ceramic bonding material.

5. The abrasive element defined in claim 4, wherein said grit is composed of about 95 percent or more of aluminum oxide ($Al_2O_3$).

6. The abrasive element defined in claim 5, wherein said soda-lime glass contains about 60 percent to about 80 percent silica ($SiO_2$), and minor amounts of sodium oxide ($Na_2O$) and calcium oxide (CaO).

7. The abrasive element defined in claim 6, wherein said bonding material has a major amount of silica ($SiO_2$) and a minor amount of aluminum oxide ($Al_2O_3$).

8. The method of making an abrasive element comprising providing a molded mixture of (a) abrasive grit composed primarily of grains of aluminum oxide ($Al_2O_3$), (b) unvitrified ceramic bonding material, and (c) a poreforming material comprising crushed glass having no more than trace amounts of compounds of the $R_2O_3$ type wherein R represents any positive ion and which has a strong affinity for the grains of aluminum oxide when melted by heating, and heating the molded mixture to melt the glass and cause the glass to be attracted to and coat the grains of aluminum oxide and form a bond with the abrasive grit and continuing to heat the molded mixture to a higher temperature to vitrify the ceramic bonding material and form a bond between the glass and vitrified bonding material with voids in the latter in the spaces previously occupied by the unmelted crushed glass to form pores in the abrasive element.

9. The method defined in claim 8, wherein said crushed glass is soda-lime glass including a major amount of silica ($SiO_2$) and minor amounts of sodium oxide ($Na_2O$) and calcium oxide (CaO).

10. The method defined in claim 8, wherein said bonding material includes feldspar, frit and clay and has a major amount of silica ($SiO_2$) and a minor amount of aluminum oxide ($Al_2O_3$).

* * * * *